July 18, 1944.   B. F. CONNER   2,353,995
MOLDED ARTICLE AND METHOD OF MAKING THE SAME
Filed June 4, 1940

Inventor
Benjamin F. Conner.
By S. Jay Teller
Attorney

Patented July 18, 1944

2,353,995

UNITED STATES PATENT OFFICE 2,353,995

MOLDED ARTICLE AND METHOD OF MAKING THE SAME

Benjamin F. Conner, West Hartford, Conn., assignor to Colt's Patent Fire Arms Manufacturing Company, Hartford, Conn., a corporation of Connecticut Application June 4, 1940, Serial No. 338,707

4 Claims. (Cl. 41—10)

The primary object of the invention is to provide an article of manufacture comprising a shaped body of crystal clear molded synthetic resin having pieces of solids embedded therein so as to render the article substantially non-transparent, the pieces of solids being colored or colorless, or transparent or opaque, as desired, and being visible within the crystal clear molded body.

Another object is to provide an article of the above character in which some of the pieces of solids are larger than others and the pieces are so related that the larger ones appear to be embedded in a matrix material formed of the smaller pieces.

A still further object is to provide a method of making articles of the above mentioned character.

In the accompanying drawing I have shown the now preferred embodiments of the invention, but it will be understood that the drawing is intended for illustrative purposes only and is not to be construed as defining or limiting the scope of the invention, the claims forming a part of this specification being relied upon for that purpose.

The invention relates to articles of manufacture for which it is desired to provide an attractive and beautiful material. Among the articles to which the principles of the invention may be applied are, for example, cosmetic containers, vanity cases, perfume container closures, and jewelry including imitation and novelty gems.

In accordance with the broader aspects of the invention, a shaped body of crystal clear molded synthetic resin is provided in which are embedded pieces of solids of such a character and in such a way as to render the article substantially nontransparent. For the purposes of this specification the invention is illustrated in connection with its application to gem shaped articles, but it should be understood that it is not so limited.

Figure 1:
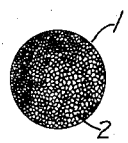
Fig. 1 is a plan view of one embodiment of the invention.
Figure 2:
Fig. 2 is an elevational view of the article shown in Fig. 1.

Referring to Figs. 1 and 2, there is shown a gem of cabochon shape, the body of which is formed of a crystal clear molded synthetic resin such as methyl methacrylate, polystyrene, or other material preferably having a relatively low plasticizing temperature and which can be molded into a shaped crystal clear form, all being herein referred to as "synthetic resin." It should be understood that the term "crystal clear" as used herein comprehends transparency or translucency, either colored or colorless. Embedded in the body are pieces of solids 2 which are preferably, though not necessarily, variously colored; for example, the pieces of solids used may be a combination of light and dark red, red and green, brown and yellow, or black and silver. When variously colored solids are used the proportions of the pieces of different color may be varied as desired to obtain quite different effects. Different effects may also be obtained by varying the size of the pieces of solids used. The pieces 2 are preferably of irregular shape such as may be obtained by breaking them from or crushing larger pieces. For reasons which will be apparent hereinafter, the pieces of solids should have a plasticizing temperature higher than that of the body material. While many different solids may be used, it has been found that broken pieces of molded urea-formaldehyde synthetic resin material such as may be obtained by breaking up flash formed when molding other articles of this material are admirably adapted for this purpose due to permanency of color and relative lightness in weight. Among other suitable solids are pieces of metal such as lacquered or unlacquered aluminum foil, small glass chips, metal flakes, and the so-called "glass metallics," the latter being very thin pieces of colored or lacquered glass. The embedded solids may all be of one material and color or of differing materials and colors. When colorless and transparent solids are embedded in the article, the materials forming the body and pieces of solids should be such that their indices of refraction are different so that the embedded solids will be visible within the body.

The preferred method of making an article incorporating the principles of this phase of the invention will now be described. Pieces of solids, thin sheetlike pieces of urea-formaldehyde flash for example, of desired color or colors are broken into smaller pieces of the desired size and are then thoroughly mixed with the desired proportion of granules of the synthetic resin, methyl methacrylate for example. The necessary quantity of this mixture is placed in a mold having the desired shape, the mold closed, and sufficient heat and pressure applied to plasticize the synthetic resin without plasticizing the pieces of solids. The resin is then allowed to solidify, after which the article is taken from the mold and any necessary finishing steps, such as removal of any flash, are performed.

Figure 3:
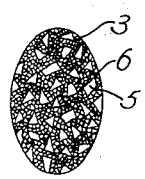
Fig. 3 is a plan view of another embodiment.
Figure 4:
Fig. 4 is an elevational view of the article shown in Fig. 3.

Referring to Figs. 3 and 4, there is shown an article 3 of oval cabochon shape, the body material 4 of which is formed of a crystal clear synthetic resin of the type above-mentioned and in which are embedded pieces of solids 5. The solids 5 may be jagged pieces of broken glass, either colored or colorless. Preferably, though not necessarily, there are additional pieces of solids 6 embedded in the body material 4 and these are of a relatively smaller size than the pieces 5. The pieces 5 and 6 are relatively positioned so that the larger pieces appear to be embedded in and jutting forward from a matrix material formed of the smaller pieces. The following description of an article incorporating the principles of this phase of the invention will serve to give an understanding of the beautiful effects which may be obtained. A cabochon was made in which the body material was colorless crystal clear methyl methacrylate, embedded in the body material adjacent the back surface of the cabochon was a stratum of relatively small pieces of silvered glass metallics, and jutting forward from this layer were larger pieces of broken red and blue glass. The general effect was to give the impression that a piece of some mineral formation of red and blue crystals had been molded within the cabochon.

An article embodying the invention of Figs. 3 and 4 may be made by placing a quantity of the synthetic resin in the mold, sprinkling a layer of the pieces of solids thereover (or when the article is of the two layer type, as just described, sprinkling another layer of the smaller sized pieces of solids over the first layer), and covering the layer or layers of solids with a layer of synthetic resin. The molding and finishing steps are then carried out or performed as described above in connection with Figs. 1 and 2.

Figure 5:
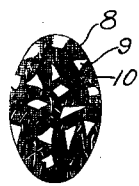
Fig. 5 is a plan view of still another embodiment.
Figure 6:
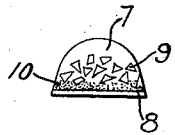
Fig. 6 is an elevational view of the article shown in Fig. 5.

In Figs. 5 and 6 there is shown an article generally similar to that of Figs. 3 and 4. It comprises a body material of crystal clear synthetic resin 7 and a layer of solids, in this case the solids are in the form of a piece of sheetlike material 8, such as metallic cloth. Other pieces of solids 9 and 10 may be embedded in the article if desired, and these pieces may be of any of the materials hereinbefore mentioned as being adapted for this use. It is apparent that the metallic cloth will give a scintillating effect, and when the solids 9 are included the cloth will serve as an effective background.

An article incorporating this phase of the invention may be made by a method similar to that described in connection with Figs. 3 and 4.

Various changes and modifications with the purview of the invention and of the appended claims will be apparent to those skilled in the art.

What I claim is:

1. An article of manufacture comprising a shaped body of crystal clear molded synthetic resin having embedded therein pieces of solids of relatively large size and pieces of solids of a smaller size and in sufficient quantity to render said article substantially nontransparent, the proportionate quantity and location of the pieces of each size within the body being such that the larger pieces appear to be embedded in a matrix material formed of the smaller pieces.

2. An article of manufacture comprising a shaped body of crystal clear molded synthetic resin having embedded therein pieces of colored solids of relatively large size and pieces of solids of a smaller size and in sufficient quantity to render said article substantially nontransparent, the proportionate quantity and location of each size of pieces within the body being such that the larger pieces appear to be embedded in a matrix material formed of the smaller pieces.

3. An article of manufacture comprising a shaped body of transparent molded synthetic resin having a polished front surface and a back surface and having pieces of solids of relatively large size embedded therein behind said front surface and also having embedded therein adjacent the back surface pieces of solids of a smaller size and in sufficient quantity to render said article substantially nontransparent, the pieces of solids of the larger size appearing to be embedded in and jutting forward from a matrix material formed of the pieces of the smaller size.

4. An article of manufacture comprising a shaped body of transparent molded synthetic resin having a polished front surface and a back surface and having pieces of colored solids of relatively large size embedded therein behind said front surface and also having embedded therein adjacent the back surface pieces of solids of a smaller size and in sufficient quantity to render said article substantially nontransparent, the pieces of solids of the larger size appearing to be embedded in and jutting forward from a matrix material formed of the pieces of solids of the smaller size.

BENJAMIN F. CONNER.